Patented Apr. 25, 1939

2,156,071

UNITED STATES PATENT OFFICE 2,156,071

SULPHUR DYES FROM HYDROXY-DIARYLAMINES

George Clifford Strouse, East Aurora, N. Y., assignor to E. I. du Pont de Nemours & Company, Wilmington, Del., a corporation of Delaware No Drawing. Application August 25, 1937, Serial No. 160,825

10 Claims. (Cl. 260—134)

This invention relates to sulphur dyestuffs prepared from the hydroxy-diarylamines, and especially to compounds of such dyestuffs which rapidly come to final shade on the fibre with air oxidation and to processes of making the compounds.

Sulphur dyes derived in the usual way by thionation of the hydroxy-diarylamines come to final shade so slowly with atmospheric oxidation that it is impossible for the dyer to determine within a reasonable time what the final shade of the dyed material will be. Although final shades can generally be obtained rapidly by the use of chemical oxidizing agents the use of these agents involves the purchase of additional costly oxidizing agents and the employment of costly additional operations. Other properties of sulphur dyes derived from the hydroxy-diarylamines are excellent and it is desirable to provide improved dyes from the hydroxy-diarylamines which will rapidly come to final shade on the fibre by means of air oxidation.

It is among the objects of the invention to provide sulphur colors made from hydroxy-diarylamines which will oxidize on the fibre in the air and come to equilibrium or final shade rapidly. Another object of the invention is to provide processes for manufacturing the dyes. Other objects of the invention will be apparent from the following more detailed description.

The objects of the invention are attained in general by thionating an hydroxy-diarylamine in aqueous alkaline medium with an alkali metal polysulphide and then aerating the reaction mixture containing the thionated compound in the presence of an excess of alkaline solution, until the free alkali sulphide is oxidized and a product which is insoluble in the dilute alkali solution is precipitated in a form which will rapidly develop to final shade by air oxidation on the fibre when the fibre is dyed with the product from a sodium sulphide dye bath.

The invention will be more particularly described with reference to the following examples which are illustrative but not limitative of the invention.

Example 1

A charge consisting of 124 lbs. of p-hydroxy-diphenylamine, 610 lbs. sulphur, 287 lbs. caustic soda flakes, 221 lbs. water and 124 lbs. "Cellosolve" (mono-alkyl ether of ethylene glycol) was heated to boiling with agitation and refluxing in a steam-jacketed stainless steel vessel. Enough water was added to the charge to give a boiling point of 121° C. The charge was refluxed until thionation was completed which required 72 hours.

An excess of caustic soda was then added. The addition consisted of 74 lbs. of 30% caustic soda. The charge was then transferred to a wooden tub where it was diluted to 300 to 350 gallons and aerated at 80° to 85° C. by blowing in a stream of air until a precipitate was formed.

Another portion of caustic soda consisting of 37 lbs. of 30% caustic soda was then added. This caused a part of the precipitate to dissolve. Aeration was continued and more precipitate was formed. Alternate additions of caustic soda and aeration were continued until the precipitated compound did not redissolve in a final alkali containing mixture which was alkaline to Clayton Yellow test paper. At this point the free sodium sulphide in solution had become oxidized. Finally, aeration was continued for 5 hours longer whilst maintaining alkalinity to Clayton Yellow test paper.

During the last 5 hours the precipitate did not partially redissolve when additions of caustic soda were made.

The precipitate consisting of the dye was filtered off and dried. The product was dyed on cotton from a sodium sulphide bath and oxidized in the air to final shade in about 1 hour. The color was redder, brighter and the dye oxidized on the fibre much more rapidly than a thionated product which had not been subjected to the hereinabove described aeration in alkaline solution.

Example 2

A mixture of 20 g. of p-hydroxy-p'-ethoxy-diphenylamine, 98.4 g. of ground sulphur, 46.2 g. of caustic soda pellets, 55 g. of water and 20 g. of "Cellosolve" was heated in a glass flask with agitation and refluxing at 121° C. for 48 hours. The mixture containing the thionated dye was diluted, treated with 20 g. of soda ash and aerated at 80–90° C. until the dye was precipitated. 10 g. more of soda ash were added and the aeration was continued for two hours when the dye was filtered off, washed and dried.

The dye obtained in this manner was redder and brighter and oxidized more rapidly on the fibre than dye made in a similar way without prolonged aeration in the presence of an alkali.

Example 3

A mixture of 30 g. of "Cellosolve", 100 g. of p-hydroxy-diphenylamine (30% paste), 147.6 g. of sulphur and 69.3 g. of caustic soda pellets was stirred in a flask until the reaction between the caustic soda and sulphur was complete. Then 24 g. of soda ash were added and the mixture refluxed at 122° C. for 73 hours in an oil bath at 180° C. Then the charge was diluted and aerated at 80–85° C. until the dye would come to final shade on the fibre in about an hour. The dye was filtered off and dried.

It was redder and brighter and oxidized more rapidly on the fibre than dye made in a similar way but without the soda ash in the thionation mass.

*Example 4*

When p-hydroxy-p'-ethoxy-diphenylamine was treated as described in Example 3, a similarly improved dyestuff was obtained.

*Example 5*

By treating the dye made from p-hydroxy-p'-methyl-diphenylamine with alkali and aerating as described in Example 1 a similar improvement was obtained.

*Example 6*

14.4 grams of p-hydroxy-diphenylamine-p'-ethyl-thio-ether, 15 g. of "Cellosolve", 30 g. of water, 71 g. of flowers of sulphur and 33.3 g. of flake caustic soda were refluxed for 45.5 hrs. at 120–121° C. The charge was diluted and the dye precipitated by aeration at 80–85° C. Then a little caustic soda was added and the dye precipitated by aeration. The alternate addition of caustic soda and precipitation by aeration was continued until the liquid became alkaline to Clayton Yellow test paper and remained so with aeration for ½ hour.

The brownish-purple dye obtained in this way oxidized rapidly on the fiber.

The preferred end point for discontinuing aeration is indicated by dyeing a sample of cotton with a portion of the precipitate from a sodium sulphide dye bath when the final shade of the dye is attained upon air oxidation in about 1 hour. However, the aeration may be continued for a longer or a shorter time depending upon the rapidity of development desired. More rapid development is attained with longer final aeration periods. After the thionated precipitate does not redissolve upon addition of alkali, it is generally desirable to prolong the aeration until the product will develop to final shade on the fibre in about ½ to 1½ hours.

It is evident that the period of final aeration will vary with the stability of different dyes and with the desired time for development on the fibre. When the sodium sulphide is oxidized and the precipitated dye does not redissolve in the dilute alkali solution, the aeration may be stopped as soon as a product is formed which has the desired speed of development.

In the aeration of the alkaline thionation mixture there appears to be a degree of oxidation of the mixture, where, after precipitation and a more or less prolonged aeration, there is a change in the rate or manner of oxidation of the aerated alkaline mixture. While the region of changed oxidation or the rate of change cannot be definitely fixed except by trial dyeings, it is within this region that the thionated precipitate is modified into a product which has the rapid rate of oxidation when dyed on the fibre from a sodium sulphide bath as hereinbefore explained.

Improved sulphur colors made from any of the hydroxydiarylamines can be produced by the processes of the invention. The hydroxy-diphenylamines may be unsubstituted or the benzene nuclei may be substituted by alkyl, alkoxy, aryloxy or halogen.

The mixture to be aerated may be made alkaline either by alkali metal hydroxides, such as sodium or potassium hydroxide, or by alkali metal carbonates, such as soda ash or potassium carbonate. Either of these alkalis may be used to provide the excess of alkali in the thionation mixture, but when the added excess of alkali in the thionation mixture consists of the carbonate as in Example 3, $Na_2CO_3$ is used in the aerated mixture.

As it is evident that the invention is capable of various modifications which can be made without departing from the invention, no limitations are intended in the annexed claims except those which are specifically recited or are imposed by the prior art.

I claim:

1. The compound obtainable by aerating a thionated p-hydroxy-diphenylamine in a water solution containing the thionation reaction medium and a solution alkaline with one of the group consisting of the alkali metal hydroxides and the alkali metal carbonates, until the sodium sulphide from the thionation reaction medium is oxidized, a compound is precipitated which is insoluble in said alkaline solution and said precipitated compound is changed into a product which is rapidly oxidizable by air-oxidation on fibre that is dyed with said product from a sodium sulphide bath.

2. The compound obtainable by aerating thionated p-hydroxy-p'-ethoxy-diphenylamine in a water solution containing the thionation reaction medium and a solution alkaline with one of the group consisting of the alkali metal hydroxides and the alkali metal carbonates, until the sodium sulphide from the thionation reaction medium is oxidized, a compound is precipitated which is insoluble in said alkaline solution and said precipitated compound is changed into a product which is rapidly oxidizable by air-oxidation on fibre that is dyed with said product from a sodium sulphide bath.

3. The compound obtainable by aerating thionated p-hydroxy-diphenylamine in a water solution containing the thionation reaction medium and a solution alkaline with one of the group consisting of the alkali metal hydroxides and the alkali metal carbonates, until the sodium sulphide from the thionation reaction medium is oxidized, a compound is precipitated which is insoluble in said alkaline solution and said precipitated compound is changed into a product which is rapidly oxidizable by air-oxidation on fibre that is dyed with said product from a sodium sulphide bath.

4. In the process of making sulphur dyes by thionating a p-hydroxy-diphenylamine in a reaction mixture containing an alkali metal sulphide, the steps which comprise aerating the thionation mixture in a water solution of the thionation mixture which is maintained alkaline with at least one of the group consisting of the alkali metal hydroxides and the alkali metal carbonates, at least until a precipitate of a dye which is formed does not redissolve when said solution is alkaline to Clayton Yellow paper and a precipitated product is formed which develops a final shade with air oxidation in a period of 30 minutes to 1½ hours on fibre dyed from a sodium sulphide bath, and separating the precipitated product from said solution.

5. In the process of making sulphur dyes by thionating p-hydroxy-p'-ethoxy-diphenylamine in a reaction mixture containing an alkali metal sulphide, the steps which comprise aerating the thionation mixture in a water solution of the thionation mixture which is maintained alkaline with at least one of the group consisting of the alkali metal hydroxides and the alkali metal carbonates, until a precipitate of a dye which is formed does not redissolve when said solution is alkaline to Clayton Yellow paper and a precipitated product is formed which develops a final shade with air oxidation in a period of 30 minutes to 1½ hours on fibre dyed from a sodium sulphide bath and separating the precipitated product from said solution.

6. In the process of making sulphur dyes by thionating a para-hydroxy-diphenylamine in a reaction mixture containing an alkali metal sulphide and an alkali metal carbonate, the steps which comprise aerating the thionation mixture in a water solution of the thionation mixture which is maintained alkaline with an alkali metal carbonate, until a precipitate of the dye which is formed does not redissolve when said solution is alkaline to Clayton Yellow paper and a precipitated product is formed which develops a final shade with air oxidation in a period of 30 minutes to 1½ hours on fibre dyed from a sodium sulphide bath and separating the precipitated product from said solution.

7. In the process of making sulphur dyes by thionating p-hydroxy-diphenylamine in a reaction mixture containing an alkali metal sulphide and an alkali metal carbonate, the steps which comprise aerating the thionation mixture in a water solution of the thionation mixture which is maintained alkaline with an alkali metal carbonate, until a precipitate of the dye which is formed does not redissolve when said solution is alkaline to Clayton Yellow paper and a precipitated product is formed which develops a final shade with air oxidation in a period of 30 minutes to 1½ hours on fibre dyed from a sodium sulphide bath and separating the precipitated product from said solution.

8. In the process of making sulphur dyes by thionating p-hydroxy-p'-ethoxy-diphenylamine in a reaction mixture containing an alkali metal sulphide and an alkali metal carbonate, the steps which comprise aerating the thionation mixture in a water solution of the thionation mixture which is maintained alkaline with an alkali metal carbonate, until a precipitate of the dye which is formed does not redissolve when said solution is alkaline to Clayton Yellow paper and a precipitated product is formed which develops a final shade with air oxidation in a period of 30 minutes to 1½ hours on fibre dyed from a sodium sulphide bath and separating the precipitated product from said solution.

9. In the process of making sulphur dyes by thionating p-hydroxy-diphenylamine in a reaction mixture containing an alkali metal sulphide and an alkali metal hydroxide, the steps which comprise aerating the thionation mixture in a water solution of the thionation mixture which is maintained alkaline with an alkali metal hydroxide, until a precipitate of the dye which is formed does not redissolve when said solution is made alkaline to Clayton Yellow paper and a precipitated product is formed which develops a final shade with air oxidation in a period of 30 minutes to 1½ hours on fibre dyed from a sodium sulphide bath, and separating the precipitated product from said solution.

10. In the process of making sulphur dyes by thionating p-hydroxy-p'-ethoxy-diphenylamine in a reaction mixture containing an alkali metal sulphide and an alkali metal hydroxide, the steps which comprise aerating the thionation mixture in a water solution of the thionation mixture which is maintained alkaline with an alkali metal hydroxide, until a precipitate of the dye which is formed does not redissolve when said solution is made alkaline to Clayton Yellow paper and a precipitated product is formed which develops a final shade with air oxidation in a period of 30 minutes to 1½ hours on fibre dyed from a sodium sulphide bath, and separating the precipitated product from said solution.

GEORGE CLIFFORD STROUSE.